July 23, 1935.   L. E. LA BRIE   2,009,112
BRAKE
Original Filed Aug. 30, 1929

INVENTOR.
LUDGER E. LA BRIE
BY
ATTORNEY

Patented July 23, 1935

2,009,112

UNITED STATES PATENT OFFICE 2,009,112

BRAKE

Ludger E. La Brie, South Bend, Ind., assignor to Bendix Aviation Corporation, South Bend, Ind., a corporation of Delaware Original application August 30, 1929, Serial No. 389,556. Divided and this application July 27, 1932, Serial No. 625,137

6 Claims. (Cl. 188—78)

This invention relates to brakes and is illustrated as embodied in an internal expanding automobile brake of the full-wrapping type in which the friction means anchors at one end when the drum is turning in one direction and at the other end when the drum is turning in the other direction.

An object of the invention is to improve both the operating and anchoring means of the brake and to facilitate its adjustment.

Preferably the brake includes operating means such as a toggle arranged in a plane parallel with the plane of the brake and which is operable by a flexible tension element connected thereto. The toggle operating means which is preferably arranged at one side of the brake serves to expand the separated ends of an annular friction element, which ends are adapted to anchor respectively through a movable link placed in tension and a stamping such as an angle iron rigidly secured to the brake support. Thus in one direction of drum rotation the braking torque is taken by the tension means and with the reverse direction of rotation the fixed abutment takes the torque.

A further object of the invention resides in the provision of a novel adjustment for the friction element disposed at one end thereof and which adjustment comprises relatively movable juxtaposed plates, the relative position of which is determined by a laterally movable wedge member adapted to abut bevelled portions at the ends of slots in the respective plates, the reaction of the wedge member in forcing the plates apart being taken by a cup-shaped washer member abutting one of said plates.

Other objects and features of the invention, including an indicating means cooperating with the aforementioned washer for indicating to the operator the position of the adjusting means; also a novel arrangement of eccentric adjustable stops for determining the idle position of the brake; and various other details of construction and combination of parts which will become apparent from the following description of one illustrative embodiment of the invention shown in the accompanying drawing, in which.

Figure 1:
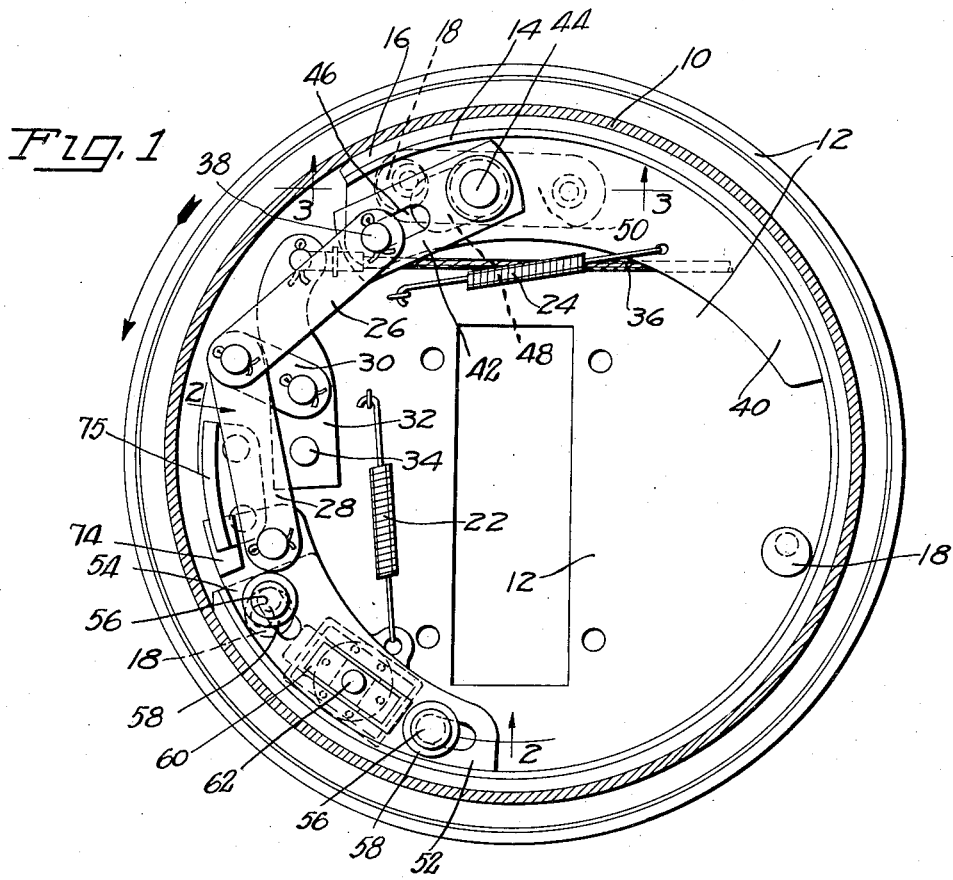
Figure 1 is a vertical section through the brake just inside the head of the brake drum, and showing the brake friction means in side elevation.

In the illustrated and preferred embodiment of the invention, the brake includes a rotatable drum 10 at the open side of which is a support such as a backing plate 12 and within which is arranged the friction means of the brake, preferably comprising a floating device such as an expansible flexible band 14 provided on its rim face in the form shown with friction lining 16 riveted or otherwise secured thereto.

The idle position of the band 14 with the brake released is determined by novel adjustable stops such as disks 18 eccentrically secured to pins 20 secured to the backing plate, the disks contacting the inner face of the band 14 and when rotated serving to force the same outwardly to determine the released position of the band under the action of springs 22 and 24. Three such eccentrics are employed one each at the ends of the band and one positioned substantially diametrically opposite the opening between the band.

The band 14 is separated to contact the rotating drum by means of a novel toggle preferably arranged at the front of the brake, that is, at one end of a horizontal diametrical line in the left front brake disclosed in Figure 1. The toggle may consist of links 26 and 28, each link comprising parallel stampings pivotally connected at their adjacent knuckle ends and arranged to be actuated by a tension link 30 pivotally secured to the knuckle and at its other end to a vertically extending applying lever 32 fulcrumed to a pin 34 rigidly secured to the backing plate 12, which lever is preferably actuated by a flexible tension element 36 pivotally secured thereto and extending through the plate 12 to be connected to the service pedal or other power source.

Figure 3:
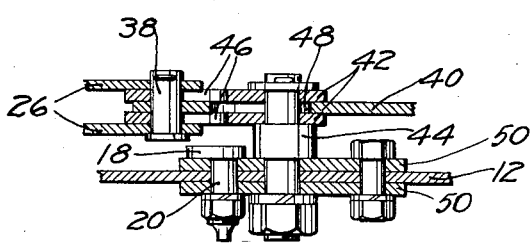
Figure 3 is a partial section, taken on the line 3—3 of Figure 1, showing in detail the anchoring structure for one end of the brake.

The link 26 of the toggle is pivotally connected to a pin 38 (Figure 3) passing through a reinforcing web 40 rigidly secured to one end of the band 14. With the wheel rotating in the direction of the arrow in Figure 1 (that is with the vehicle moving forward), the torque of the band is taken directly on pin 38 upon which are pivotally mounted parallel anchoring tension links 42 pivotally secured at their ends to an anchor pin 44 rigidly secured to the support plate 12. The anchor links are preferably slotted at 46 to permit movement of the band with its pin in the direction to anchor on its other end and the web of the shoe at 48 is slotted about the anchor pin to permit this reverse movement. This particular type of tension link anchor is more particularly described and claimed in co-pending applications of Roy S. Sanford No. 338,348, filed August 26, 1929, and Humphrey F. Parker, No. 381,195, filed July 26, 1929. Relative to this structure, it is to be noted that the eccentric adjustment pin 20 is passed through reinforcing plates 50 secured to the backing plate at the anchor pin 44.

Figure 2:
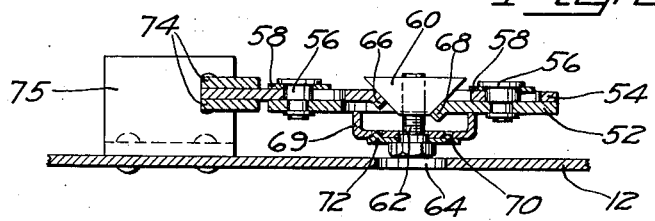
Figure 2 is a partial transverse section, on the line 2—2 of Figure 1, through the novel adjustment of the brake.

According to another feature of my invention, which forms subject matter described and claimed in my parent application No. 389,556, filed August 30, 1929, of which this application is a division, the overall length of the band between its connections to the toggle links may be increased by an adjustment structure to compensate for the wear of the friction lining, thus preserving the relative angularity of the links of the toggle and their position with respect to the remainder of the actuating mechanism. This particular construction, as more completely disclosed in Figure 2, may preferably comprise a relatively short radially extending web member 52 welded or otherwise permanently secured to the inner face of the band 14 at its lower end (Figure 1). A similar plate 54 substantially co-extensive in length with said plate 52 is preferably mounted parallel and in juxtaposition therewith and relatively movable thereto by means of pins 56 fixedly secured to the plate 52 and passing through slots in the plate 54. These pins which are provided with washers 58 slidingly contacting the sides of the plate 54 provide a slightly loose fit to permit the relative sliding movement of the two plates to effect the desired adjustment. This adjustment may be effected by a wedge-shaped member 60 threadedly mounted on the end of a set screw 62, the hex head of the latter positioned opposite an opening 64 in the backing plate to permit rotation of the same from outside the brake. The faces of the wedge may preferably abut beveled portions 66 and 68 formed by pressing toward the backing plate the body of the plates 52 and 54 at the ends of superposed rectangularly shaped slots therein to accommodate the wedge. A cup-shaped washer member 69 rectangular in peripheral outline may be provided with a circular opening to accommodate the headed end of the set screw 62, one side of the washer adapted to contact with the inner face of the band, as shown in Figure 1, to obviate turning movement of the washer.

In order to indicate to the operator the degree of angular movement of the set screw in effecting the adjustment, there is provided a circular washer member 70 having a polygonal shaped opening adapted to surround a correspondingly shaped shoulder on the set screw, which washer is also provided with tab portions 72, preferably six in number, struck inwardly from the washer to fit within corresponding openings in the cup-shaped washer 69.

The end of the adjusting plate 54 is preferably provided with projection welded plates 74 on either side thereof to increase the bearing surface in contact with an angle iron anchor member 75 rigidly secured to the backing plate and which anchor member is slotted to accommodate the thickened end of the adjusting plate.

In operation, actuation of the flexible tension element by the operator serves to apply the lever 32 to flatten the toggle, spreading the ends of the shoe apart into drum engagement. The selective anchoring of the band 14 upon either the tension link or the angle iron abutment then takes place depending upon the direction of drum rotation, and upon release of the power actuated mechanism the return springs within the brake serve to withdraw the band from the drum into contact with the aforementioned adjustable stops. With continued service of the brake and its consequent lining wear, it becomes necessary to increase the overall length of the band which is readily effected by the manual adjustment of the set screw 62 to relatively move the plates 52 and 54. The positioning of the toggle parts in the plane of the brake permits of relatively long links forming the same, which reduces to a minimum the flattening of the toggle to effect the brake application. This is particularly desired, inasmuch as the pressure applied at the ends of the toggle links is a first derivative of the angularity of the links during the spread of the same.

While one illustrative embodiment of my invention has been described in detail, it is not my intention to limit the scope of the invention to that particular embodiment or otherwise than by the terms of the appended claims.

This application is a division of co-pending application Serial No. 389,556 filed August 30, 1929.

What is claimed is:

1. A brake comprising, in combination, a rotatable drum, a floating friction device within the drum, a fixed abutment at one side of the drum adapted to take the torque of said friction element in one direction of drum rotation, a link member at the upper side of the drum adapted to be tensioned to take the braking torque in the other direction of drum rotation and a toggle connected to said band intermediate said torque-taking means and arranged to expand the band to apply the brake.

2. A brake comprising, in combination, a drum, a fixed abutment on one side of the drum, a floating expansible band within the drum having said abutment between its ends and arranged to have one end anchor against said abutment when the drum is turning in one direction and to have the other end anchor against a link placed in tension when the drum is turning in the other direction, together with a toggle arranged in the plane of the brake and connected to the ends of said band adjacent the aforementioned torque-taking means and which toggle is arranged to apply the band into drum contact.

3. A brake comprising a shoe having a web, a thrust link, a pivot pin connecting said thrust link to said web, an anchor link having a slot engaging said pin at one end, and an anchor pivot at the other.

4. A brake comprising, in combination with a drum, a backing plate at the open side of the drum, friction means within the drum having spaced ends and anchoring at one of said ends when the drum is turning in one direction and at the other of said ends when the drum is turning in the other direction, a lever within the drum and pivoted on the backing plate between said ends and operatively acting on said ends and which extends upwardly along one side of the backing plate, and a generally horizontal operating cable extending through the backing plate and connected to said lever.

5. A brake comprising, in combination with a drum, a backing plate at the open side of the drum, friction means within the drum having spaced ends, a simple lever wholly within the drum and pivoted on the backing plate between said ends and operatively acting on said ends and which extends upwardly along one side of the backing plate, and a generally horizontal operating cable extending through the backing plate and connected to said lever at its upper end, said cable and lever forming substantially a right angle and being arranged for efficient use of the space enclosed by the brake drum and backing plate.

6. A brake comprising, in combination with a drum, a backing plate at the open side of the drum, friction means within the drum having spaced ends, a lever within the drum and pivoted on the backing plate between said ends and operatively acting on said ends and which extends upwardly along one side of the backing plate, a generally horizontal operating cable extending through the backing plate and connected to said lever, and anchorage means for said ends permitting them to shift under load, when the brake is applied, radially of the drum.

LUDGER E. LA BRIE.